Sept. 28, 1954  W. FEDANKIW ET AL  2,689,991
RESILIENT FASTENER
Filed Jan. 9, 1952

WOLODYMYR FEDANKIW
EUGEN WYNNYK
INVENTORS

ATTORNEY

Patented Sept. 28, 1954

2,689,991

UNITED STATES PATENT OFFICE 2,689,991

RESILIENT FASTENER

Wolodymyr Fedankiw and Eugen Wynnyk, Binghamton, N. Y.

Application January 9, 1952, Serial No. 265,642

2 Claims. (Cl. 24—73)

This invention relates to resilient fasteners of the type which may be used for resiliently or yieldingly connecting adjacent or abutting edges of material.

The primary object of the invention is to provide such a fastener which is of few parts, simple and inexpensive to manufacture, attractive in appearance and long lasting.

Another object is to provide such a fastener which, when applied to shoes, clothing or other things, in a manner to be described, serves as a permanent fastening means which requires no "lacing" or other operation to render it effective.

Other objects and advantages will be apparent as the description proceeds, reference now being made to the accompanying drawing forming a part of this specification.

Figure 1:
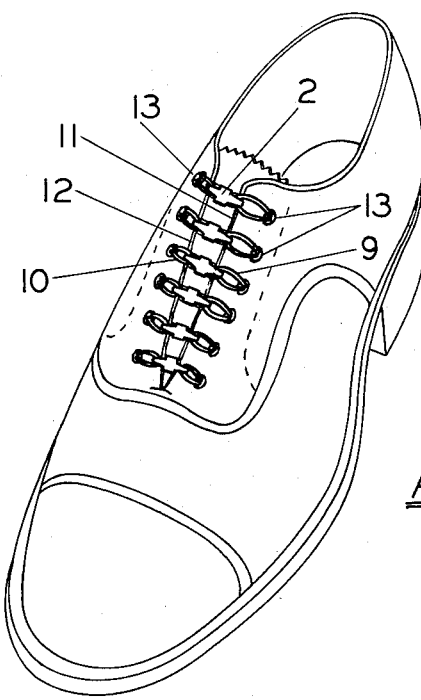
Fig. 1 is an outline perspective view of a shoe equipped with fasteners of this invention and illustrating one practical use thereof.

Although the invention has been shown in the drawing as applied to shoes, it will be understood that this is illustrative only and not limitative. Obviously the fastener is equally applicable to other articles of clothing, such as corsets, girdles, belts and the like, as well as other articles or materials having edges which it is desired to hold in yieldingly abutting or adjacent relation.

The invention consists of a fastener comprising two parts, an elastic cord 1 and a holding plate 2.

The cord 1 may be of any suitable elastic material capable of stretching under tension and resuming its normal length and position when the tension is removed. It may be of any color, size or tensile strength—depending upon the particular use of the fastener.

The cord 1 is a single length of material with its two ends 3 and 4 (Fig. 3) brought together to form the cord into a loop.

Figure 2:
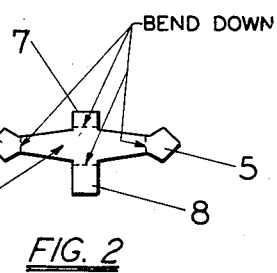
Fig. 2 is a detail plan view of one part of this improved fastener.

The holding plate 2, which may be of any desired shape, size or color, depending upon the use to which the fastener is to be put, is preferably a flat metal stamping having bendable tabs 5 and 6 (Figs. 2 and 3) at its ends and bendable tabs 7 and 8 extending laterally in opposite directions from the plate, midway of its length. The plate 2 and the tabs 5, 6, 7 and 8 are preferably formed as one flat piece, as shown clearly in Fig. 2.

It will be noted that the lateral tab 8 is approximately twice the length of tab 7, for a purpose to be described.

Figure 3:
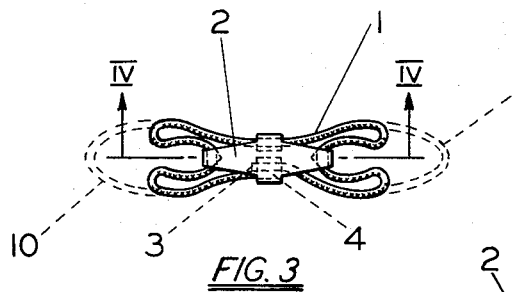
Fig. 3 is a detail plan view of both parts of the fastener in assembled position.

The fastener is assembled as follows:

The ends 3 and 4 of the cord 1 are brought together in adjacent and overlapping relation, as shown in dotted lines in Fig. 3. The ends are secured in such position by bending the elongated tab 8 of the plate 2 down and around such ends, thus holding them tightly against the underside of the plate. The longer length of tab 8 permits it to receive and tightly clench both of the overlapping ends 3 and 4 of the cord 1.

Figure 4:
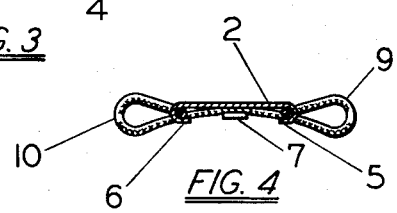
Fig. 4 is a sectional view of the assembled fastener, taken on the line IV—IV of Fig. 3.

The looped cord 1, at a point directly opposite the secured ends, is now brought beneath the holding plate 2 and the short tab 7 is bent down and around the cord at this point, clinching it tightly in this position against the underside of the plate (see Figs. 3 and 4).

Thus a bight is formed in the looped cord 1 by the tabs 7 and 8 of the plate 2, with loops 9 and 10 of the cord extending beyond the ends of the plate—as shown in dotted lines in Fig. 3.

The fastener is now ready for assembly upon the shoe or other article with which it is to be used.

As illustrated in Fig. 1, there are two adjacent edges 11 and 12 to be elastically held in adjacent relation, in this case a shoe having the usual openings or eyelets 13 alongside such edges for lacing.

The extending loops 9 and 10 of the cord 1 are inserted through oppositely disposed openings 13 of the adjacent edges 11 and 12 of the shoe material and are then brought back under the plate 2 where they are secured by bending the end tabs 5 and 6 down and around the cord beneath the plate (see Figs. 1, 3 and 4).

Obviously, the number of fasteners—and their spacing—will be determined by the length of the adjacent edges to be held and the nature of the material, appearance desired, etc.

It will be apparent that the use of these improved fasteners as shown and described herein, the operations of lacing and unlacing with rigid fastening means is eliminated. For example, as applied to a shoe, the user may insert his foot in the shoe in the usual manner. The loops 9 and 10 of the elastic cord 1 will yield and stretch under the tension of forcing the edges 11 and 12 of the shoe material apart to permit the foot to enter the shoe. When the foot is within the shoe, the tension is relieved and the elastic cord resumes its normal position and continues to yieldingly and comfortably hold the edges 11 and 12 in proper relation.

The fasteners function in the same manner when wearing the article, as during the process of walking, and in removing it.

The fastener may be readily replaced, if necessary, by cutting the cord 1 or bending back the tabs 5 and 6 to release the loops 9 and 10.

The utility and advantages of this simple, inexpensive, two-piece fastener are believed to be obvious from the foregoing.

We claim:

1. A fastener comprising a single length of elastic cord, a holding plate having end tabs and lateral tabs, one of said lateral tabs securing the ends of said cord together and to the plate and the other lateral tab securing the cord intermediate its ends to the plate to form a pair of bights, a different one of said bights extending beyond each end of said plate, the bights in said cord being engageable with the edges of material to be fastened by passing through holes therein and secured by said end tabs to said plate.

2. A fastener comprising a single length of elastic cord, a holding plate having end tabs and lateral tabs, one of said lateral tabs being longer than the other for securing the ends of said cord together and to the plate, the other lateral tab securing the cord intermediate its ends to the plate to form a pair of bights in said loop, a different one of said bights extending beyond each end of said plate, the bights in said cord being engageable with the edges of material to be fastened by passing through holes therein and secured by said end tabs to said plate.

References Cited in the file of this patent

UNITED STATES PATENTS

| Number | Name | Date |
|---|---|---|
| 299,819 | Mason | June 3, 1884 |
| 452,753 | Hayden | May 19, 1891 |
| 556,383 | Teeter | Mar. 17, 1896 |
| 1,934,455 | Staude et al. | Nov. 7, 1933 |
| 1,966,135 | Reh | July 10, 1934 |

FOREIGN PATENTS

| Number | Country | Date |
|---|---|---|
| 33,965 | Austria | Aug. 10, 1908 |
| 595,001 | Germany | Mar. 26, 1934 |